United States Patent [19]

Koch

[11] Patent Number: 4,539,019

[45] Date of Patent: Sep. 3, 1985

[54] CONTROL SYSTEM FOR AIR FRACTIONATION BY SELECTIVE ADSORPTION

[75] Inventor: William R. Koch, Fleetwood, Pa.

[73] Assignee: Air Products & Chemicals, Inc., Allentown, Pa.

[21] Appl. No.: 612,821

[22] Filed: May 22, 1984

Related U.S. Application Data

[63] Continuation-in-part of Ser. No. 537,305, Sep. 29, 1983, abandoned.

[51] Int. Cl.$^3$ .............................................. B01D 53/04

[52] U.S. Cl. ........................................... 55/21; 55/31; 55/33; 55/58; 55/68; 55/162; 55/163; 55/179

[58] Field of Search ................... 55/18, 21, 25, 26, 31, 55/33, 58, 62, 68, 75, 161-163, 179, 387, 389, 180, 208, 73, 74

[56] References Cited

U.S. PATENT DOCUMENTS

| | | | |
|---|---|---|---|
| 3,533,221 | 10/1970 | Tamura | 55/33 |
| 3,957,463 | 5/1976 | Drissel et al. | 55/25 |
| 4,013,429 | 3/1977 | Sircar et al. | 55/33 |
| 4,021,210 | 5/1977 | Streich et al. | 55/26 |
| 4,168,149 | 9/1979 | Armond et al. | 55/75 X |
| 4,197,095 | 4/1980 | White, Jr. et al. | 55/21 X |
| 4,205,967 | 6/1980 | Sandman et al. | 55/21 |
| 4,247,311 | 1/1981 | Seibert et al. | 55/163 X |
| 4,264,340 | 4/1981 | Sircar et al. | 55/25 |

*Primary Examiner*—Robert H. Spitzer
*Attorney, Agent, or Firm*—Geoffrey L. Chase; E. Eugene Innis; James C. Simmons

[57] ABSTRACT

In a cyclic VSA system for air fractionation by selective adsorption of nitrogen from the feed air during an on-stream adsorption period in said cycle in which period an oxygen-enriched primary effluent discharged from the adsorption column is collected in a surge vessel, the duration of the on stream adsorption step is automatically controlled by a sensing device monitoring inventory of gas collected in said surge vessel. In an alternative embodiment the adsorbed nitrogen is withdrawn by vacuum desorption of the column and collected in a second surge vessel, from which second vessel a portion of the nitrogen is subsequently withdrawn for use in rinsing the nitrogen laden column, said second surge vessel being likewise equipped with inventory monitoring means operative for automatically controlling the extent of the rinsing step. Alternately, when nitrogen is collected in a second surge vessel, the system may be operated by inventory monitoring of both surge vessels or only one surge vessel wherein another technique is used to control the other surge vessel.

23 Claims, 7 Drawing Figures

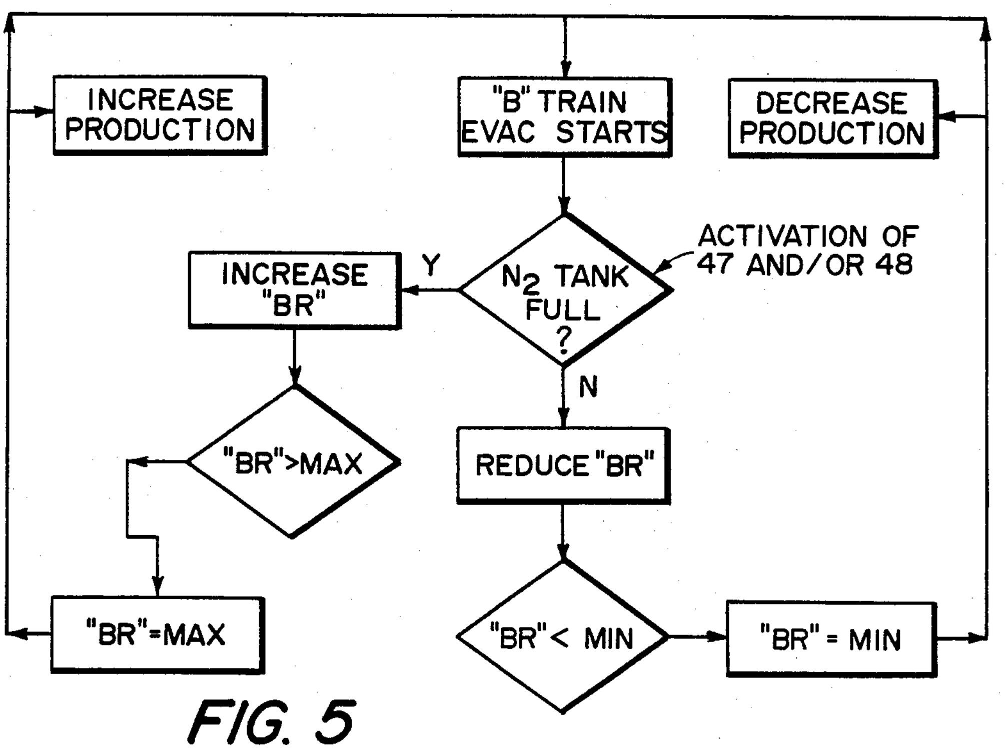
FIG. 5
FIG. 6
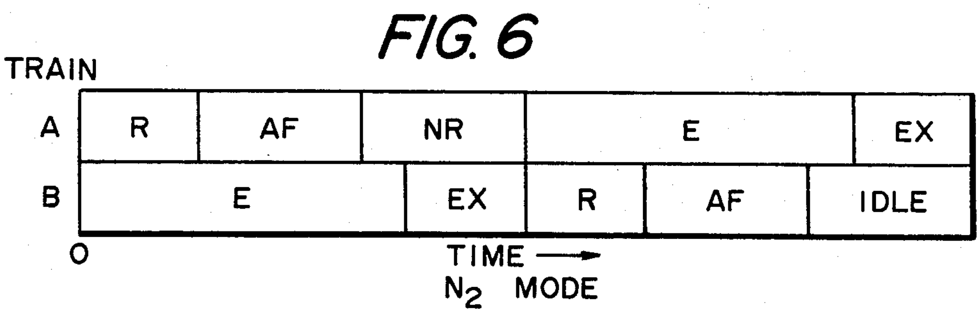
FIG. 7
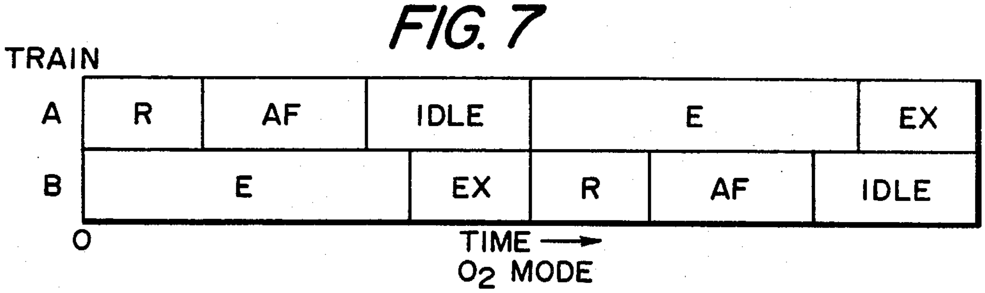

CONTROL SYSTEM FOR AIR FRACTIONATION BY SELECTIVE ADSORPTION

CROSS REFERENCE TO RELATED APPLICATION

This application is a continuation-in-part of U.S. application Ser. No. 537,305, filed Sept. 29, 1983 now abandoned.

BACKGROUND OF THE INVENTION

The present invention relates to fractionation of gas mixtures by selective adsorption and is particularly concerned with recovery from mixed gas streams, such as atmospheric air, of an oxygen-enriched gas fraction with or without accompanying recovery of a high purity nitrogen product.

Systems for separation of air components by selective sorption to recover oxygen and/or nitrogen are well known in the art. Typically, most of the known systems employ a zeolite molecular sieve adsorbent bed for selective retention of nitrogen from the feed gas while collecting an oxygen-enriched product stream as primary effluent. Periodically, as the sorbent bed reaches a designed level of sorbed gas, the bed is desorbed and/or purged to remove contained nitrogen, before being returned to on-stream operation. The adsorption-desorption cycles rely chiefly on swing in pressure level of these steps in the operating cycle. Also, to maintain continuity of operation, a number of such adsorbent beds are operated in parallel, so that while one bed is operating on the adsorption step of the cycle, one or more companion beds are at various stages of regeneration.

In certain known systems, the feed gas charge is introduced into the adsorption column at an initial relatively high pressure during the adsorption step, then the pressure of the column is lowered to near atmospheric pressure or to a level below atmospheric to effect desorption of the column. The desorbed bed is purged, usually with part of the unadsorbed effluent from the adsorption step, followed by repressuring the bed to its initial high pressure level for repetition of the cycle. In certain systems applied to air fractionation, the desorption of the nitrogenaloaded adsorbent is effected under vacuum.

Air fractionation by vacuum swing adsorption (VSA) is described, for example, in U.S. Pat. Nos. 3,533,221, 3,957,463, 4,013,429 and 4,264,340. As described in the '429 patent, the operation involves a sequence of four principal steps: wherein (1) ambient air, freed of moisture and $CO_2$ in a pretreatment column, is passed through a column in series therewith containing a bed of adsorbent selective for retention of nitrogen in the feed, while unadsorbed oxygen-enriched product gas is being recovered as primary effluent collected and stored in a surge chamber such as an expansible receiving vessel. The ambient air feed is continued until incipient breakthrough of air occurs or somewhat short of it, depending upon the desired concentration of the oxygen-enriched product. The flow of air to that bed is then discontinued and switched to a companion bed which had been previously regenerated and brought to the designed on-stream pressure level. The off-stream adsorbent bed is now (2) rinsed with high purity nitrogen collected from a previous step in the cycle, thus saturating the bed with nitrogen. The nitrogen saturated bed is next (3) evacuated thereby desorbing the high purity nitrogen, part of which is used as rinse gas (in step 2) and the remainder collected as desired high purity nitrogen product and stored in a surge chamber. After the evacuation of the bed to the desired level, (4) a part of the previously collected oxygen-rich product gas is withdrawn from the surge chamber and introduced into the bed to saturate the bed and to bring it back to the desired pressure level for initiating resumption of the ambient air feed and repetition of the cycle.

A similar operating sequence is disclosed in the '340 patent, except that the system is combined with an operatively associated thermal swing section for drying the wet nitrogen stream recovered by vacuum desorption of the pretreater column and the main nitrogen adsorption column.

In the operation of the prior systems, as described in the '429 and '340 patents, the time period duration for each of the steps of the cycle sequence is fixed by a preset program, the opening and closing of the various flow-control valves involved being under control of a cycle timer device.

In a copending patent application, Ser. No. 416,433, filed Sept. 9, 1982, now U.S. Pat. No. 4,472,177, a programmed system is disclosed wherein the time duration of the adsorption step and the nitrogen rinse step in a VSA process for air fractionation, is each automatically controlled by sensing the analyzed percent composition of the respective withdrawn product streams during these steps, and terminating the adsorption and rinsing, respectively, when preset composition levels are attained. Also, the extent of evacuation of the main adsorbent bed and of the pretreatment bed is controlled automatically to terminate when preset vacuum levels are sensed. In similar manner, the control system operates to terminate the repressuring step when a preset pressure level is attained. The flow rate of input atmospheric air remains contant.

SUMMARY OF THE INVENTION

In accordance with the present invention, a novel automatic control system is provided for regulation of the vacuum swing adsorption process, wherein the air feed and/or nitrogen rinse stages of the cycle are automatically adjusted in response to the inventory of oxygen and/or nitrogen respectively in the separate surge vessels wherein these products are collected. The inventory is monitored by pressure sensors and/or level sensors on the oxygen and nitrogen surge vessels. By utilization of these controls, the production rate for oxygen and/or nitrogen can be varied as desired or required.

BRIEF DESCRIPTION OF THE DRAWINGS

FIG. 5 is an auxiliary block diagram program for extending or reducing the duration of the nitrogen rinse step responsive to the quantity of nitrogen in the storage vessel;

FIG. 6 is a cycle sequence chart of an operation according to the embodiments of FIGS. 1 and 2;

FIG. 7 is a cycle sequence chart of an operation according to the embodiment of FIG. 3.

DETAILED DESCRIPTION OF THE SEVERAL EMBODIMENTS OF THE INVENTION

Figure 3:
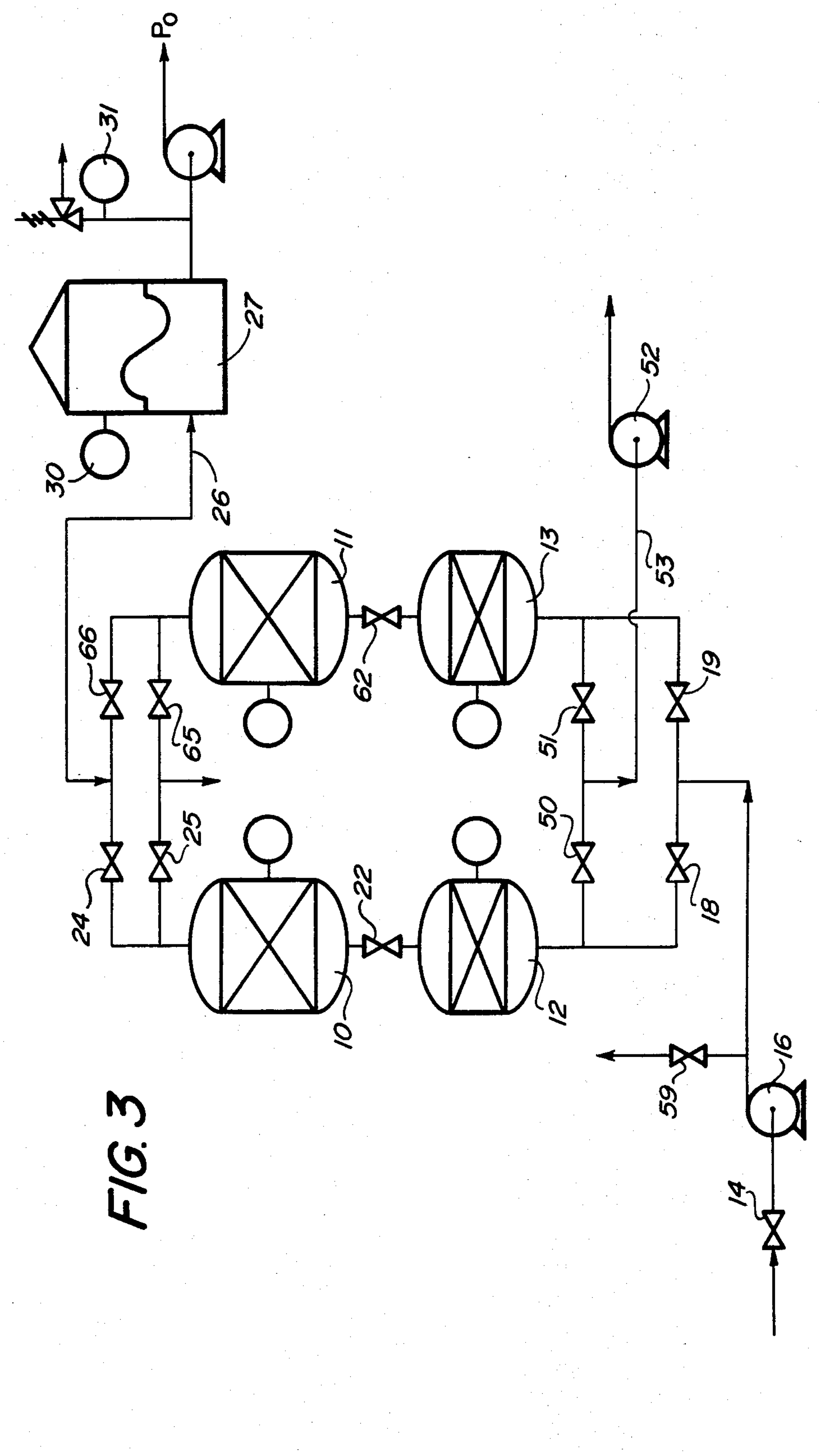
FIG. 3 is a schematic flow diagram of a simplified modification of FIG. 1, designed particularly for optimum production of an enriched oxygen product stream, eliminating the nitrogen rinse step and the surge vessel for collection of nitrogen product gas.

With the exception of the modified embodiment illustrated in FIG. 3, the operating sequence of the principal steps employed in practice of the invention conforms to that described in the '429 patent, namely: (1) adsorption, (2) nitrogen rinse, (3) desorption and (4) repressuring.

At least two trains of adsorbent beds are preferably employed, each train comprising a pretreatment bed and a main bed, the trains being operated alternately, so that the charge of input air can be switched from one train to the other.

Figure 1:
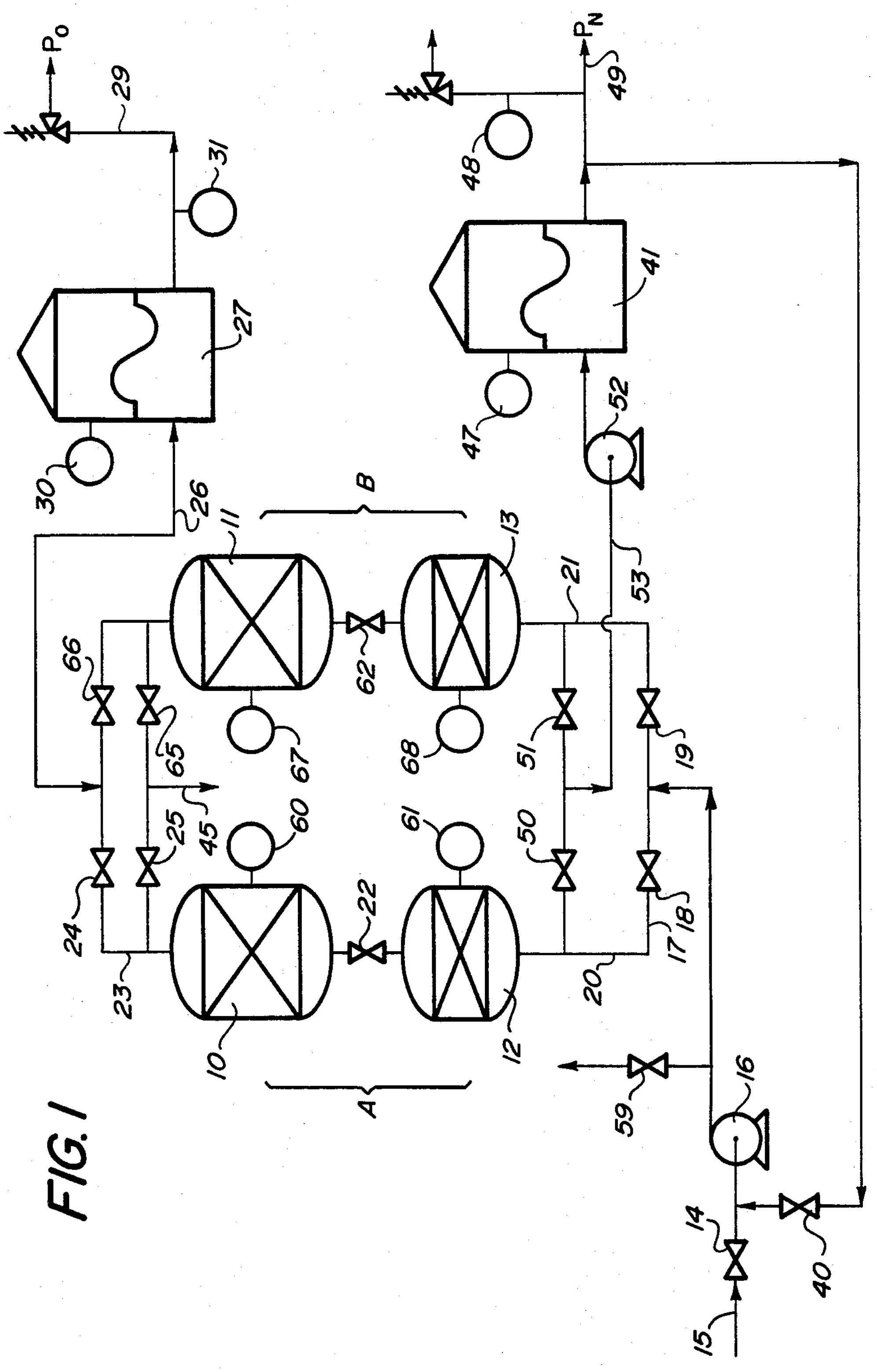
FIG. 1 is a schematic flow diagram illustrative of a system for practice of the invention in accordance with one embodiment thereof, designed particularly for optimum production of high purity nitrogen.

Referring now to FIG. 1, the nitrogen selective adsorbent is contained in two parallel adsorbent columns 10 and 11, operating alternately in controlled sequence. Upstream of columns 10 and 11, respectively, are adsorbent beds 12 and 13 containing solid adsorbent effective in removal of water and $CO_2$ from the incoming air prior to its admission to column 10 or 11. Air to be fractionated is supplied by line 15 through blower 16 discharging into manifold 17. Alternate feeding of the air charge into train A comprised of columns 12 and 10 and alternately into train B comprised of beds 13 and 11, is had by the opening and closing of valves 18 and 19, thus supplying the feed air to bed 12 of train A through line 20 when valve 18 is in open position and to bed 13 of train B through line 21 when valve 18 is closed and valve 19 opened. During the on-stream period in which the ambient air containing moisture and $CO_2$ is being introduced into the pretreatment bed 12 through valve 18, valve 22 in the line between that bed and main bed 10, is open. The air, thus freed of moisture and $CO_2$ in passing through pretreatment bed 12, now flows into and through bed 10, in which bed nitrogen is selectively adsorbed, while an oxygen-enriched effluent gas is discharged into line 23, valve 24 being open and valve 25 closed.

Line 23 feeds into discharge line 26, communicating with the expansible surge vessel 27 in which the oxygenrich effluent is collected and temporarily stored. The stored gas may be withdrawn from surge vessel 27 through line 29, as required for further processing or desired use. Alternately, a fixed volume vessel can be used in place of vessel 27.

Thus far, the described operation is no different than that of the '429 patent. According to the present invention, however, inventory control of the content of gas in surge vessel 27 and/or of the nitrogen containing surge vessel (hereinafter described) is utilized to regulate the air feed and/or nitrogen rinse steps of the process. The inventory in these surge vessels is controlled by pressure sensors and/or level sensors operatively associated with these vessels.

Feeding of air to pretreatment column 12 and discharge of the oxygen-enriched primary effluent from column 10 into surge vessel 27 continues, while the internal pressure in that vessel is being increased by the admitted oxygen-rich gas. Vessel 27 is provided with a level sensing device 30 which is activated when the bladder in surge vessel 27 reaches a set height level. Instead of, or in addition to, level sensing device 30, the inventory in surge vessel 27 may be controlled by a pressure sensor 31. Preferably, activation of 30 and/or 31 effects, by suitable relays, the closing of valves 14 and 24 and the opening of valve 25, thus discontinuing flow of feed air into the train comprising columns 12 and 10. At this time also, valve 40 is automatically opened, initiating the nitrogen rinse of columns 12 and 10, as hereinafter described.

If the air feed step is terminated before surge vessel 27 has been completely filled to the preset level or before there is a breakthrough of nitrogen from column 10, a timer device may be added, if desired, to extend continuance of the air feed for a fixed delay time period following activation of 30 and/or 31. Alternately, a fixed time device can be used to determine the entire air feed step when used in conjunction with inventory control of the nitrogen rinse step of vessel 41.

The nitrogen rinsing of beds 12 and 10 is carried out in the same gas flow direction as that of the preceding air feed introduction. Nitrogen is withdrawn from storage in surge vessel 41 by blower 16, operating as a pump, and discharged via line 17 and open valve 18 into line 20, by which the nitrogen is introduced into pretreatment column 12. The introduced nitrogen continues flow through column 12 and open valve 22 into and through column 10, rinsing contained voids gas out of that column. The rinse effluent leaves column 10 through open valve 25 and is wasted to the atmosphere via discharge line 45. If so desired, provision may be made for separately collecting the gas being discharged through line 45.

The nitrogen rinse step is preferably controlled by the inventory of gas in the nitrogen surge vessel 41. Vessel 41 is equipped with a height level control sensor 47 and/or a pressure sensor 48. As nitrogen is charged into vessel 41 (from a source hereinafter described) the pressure in that vessel will correspondingly increase until the increased pressure is such as to activate sensor 48 (or level sensor 47). Such activation of the sensors will occur when the volume of nitrogen introduced into surge vessel 41 exceeds the total volume withdrawn from that vessel for use in the rinse step plus that withdrawn as product via line 49. Sensor 47 or 48 may be operatively connected with a timer device so arranged that when the sensor is activated, a fixed delay time period is provided by the timer to utilize the excess nitrogen for extended nitrogen rinse, thereby effectively increasing product purity. If the sensor is not activated during the cycle, the nitrogen rinse timer is decreased by a fixed amount. The nitrogen rinse time period will thus continue to decrease in increasing increments during each succeeding cycle until the inventory in surge vessel 41 is thereby increased to a sufficient level to activate sensor 47 or 48. Thus by utilizing sensor 47 or 48, the available volume of nitrogen gas (as determined by extent of nitrogen rinse time) is adjusted to compensate for increase or decrease in the product nitrogen and increases or decreases, as a result of temperature variations, in the volume of the nitrogen gas had from vacuum desorption of the nitrogen laden adsorbent bed. Alternately, a fixed time device can be used to determine the entire nitrogen rinse step when used in conjunction with inventory control of the air feed step as described above.

Actuation of sensor 47 or 48 initiates, with or without time delay, the closing of valves 18, 25 and 40 and the opening of valve 50, thus terminating the rinsing step and initiating the evacuation step of the operating sequence. By operation of vacuum pump 52, with valves 24 and 25 in closed position, contained gas is desorbed from the bed in column 10, passing via open valve 22 into and through pretreatment column 12 and is withdrawn via open valve 50 and line 53 into the inlet of pump 52, the outlet of which pump discharges into surge vessel 41.

Evacuation of columns 10 and 12 is continued for a fixed time period which is preset to yield the desired vacuum level. At the end of this preset time period valve 22 between columns 10 and 12 is closed and evacuation of column 12 continued for a further fixed time period. The extended time period preferably coincides with the completion of the nitrogen rinse step in train B.

When flow communication between columns 10 and 12 has been discontinued by the closing of valve 22, the repressurization of column 10 is initiated by the simultaneous opening of valve 24. Oxygen-rich gas is withdrawn from surge vessel 27 and passed via lines 26 and 23 into evacuated column 10. During this period further evacuation of pretreatment column 12 is continued.

When the fixed period for the continued evacuation of column 12 has been completed, valve 50 closes and valve 22 reopened allowing flow of oxygen-rich gas from column 10 into column 12 for repressuring the latter column. When both columns 10 and 12 reach the preset pressure level, either or both control switches 60 and 61, operatively associated with columns 10 and 12 respectively, are activated, thereby ending the repressurization of the column in train A and signaling the resumption of air feed into that train to repeat the described cycle of operations.

Train B alternately undergoes the same sequence of operations as described in connection with train A. When repressurization of both columns 10 and 12 of train A is begun by closing valve 50 and opening valve 22, evacuation of columns 11 and 13 is begun. The position of the flow control valves associated with the columns in train A and train B during their respective operating stages is shown in Table 1, as applied to a system having two parallel trains operating in parallel. Pressure control switches 67 and 68 in the B train correspond to switches 60 and 61 of the A train and serve corresponding functions.

Figure 2:
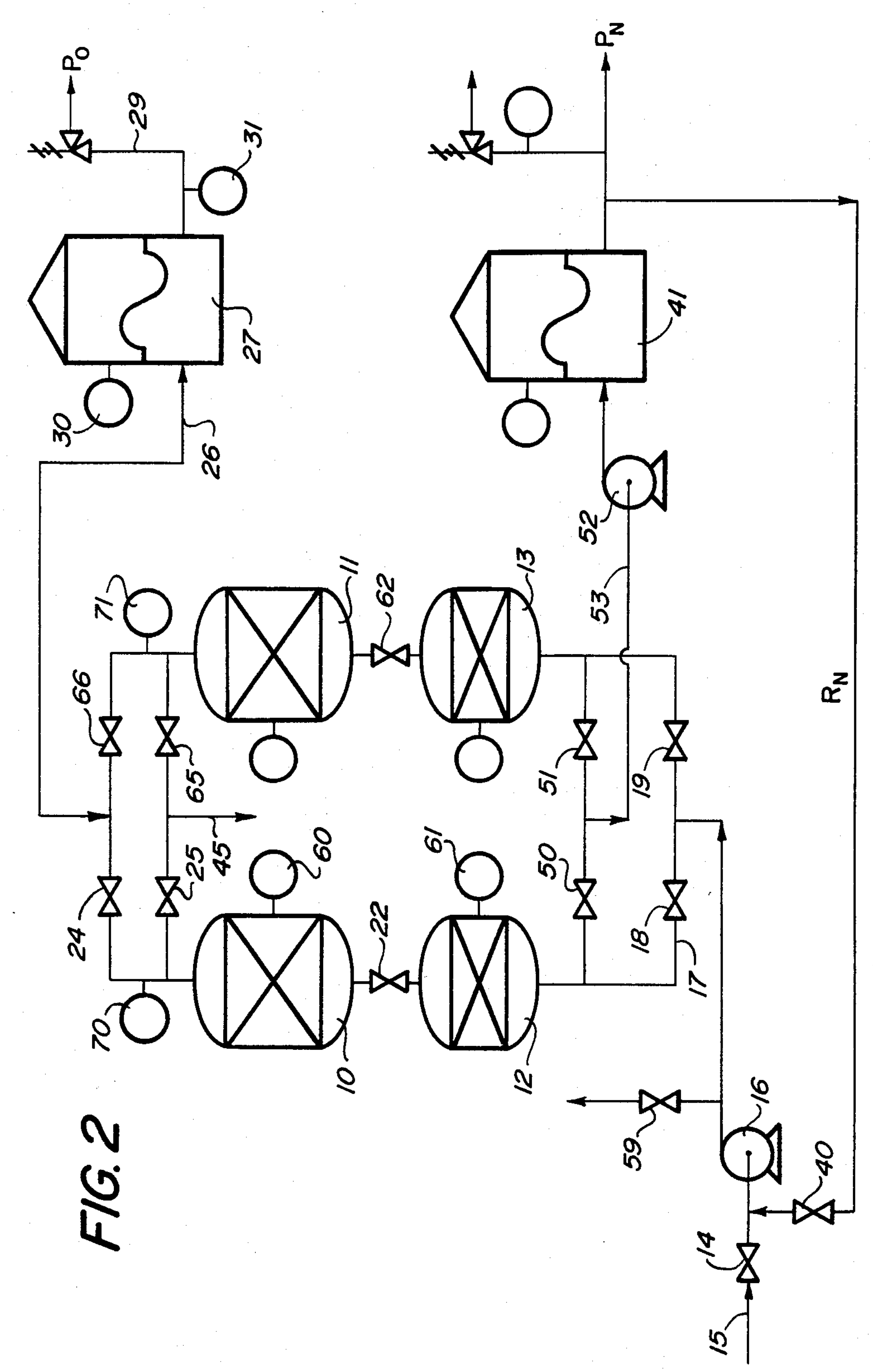
FIG. 2 is a schematic flow diagram of a system similar to that of FIG. 1, but utilizing a different arrangement to terminate the evacuation step in the cycle sequence.

The same described sequence of steps is employed in the system illustrated in FIG. 2, wherein the common elements are represented by the same numerical reference characters. A different control arrangement is used in the FIG. 2 modification to terminate the evacuation step. As seen in FIG. 2, the main adsorbent columns 10 and 11 are provided respectively with vacuum sensing switches 70 and 71.

Evacuation of the A train begins, as before described, upon completion of the nitrogen rinse step. Evacuation continues until the switch 70 is activated at a preset vacuum level. Activation of 70 effects the closing of valve 22 between columns 10 and 12, and permits continued evacuation of pretreatment column 12 alone for a preset fixed time period and/or until the nitrogen rinse of the B train has been completed. While the further evacuation of column 12 is being continued with valve 22 closed, oxygen-rich gas from storage vessel 27 flows into column 10 via open valve 24.

The operation of the embodiments of FIGS. 1 and 2 as hereinabove described is particularly beneficial when the VSA system is being operated for optimum production of high purity nitrogen. When the emphasis is on oxygen recovery the simplified system illustrated in FIG. 3 may be employed. In the modified system of FIG. 3, nitrogen storage vessel 41 is eliminated as well as valve 40 otherwise present in the nitrogen rinse line, since the nitrogen rinse step need not be employed. The cycle, accordingly, when operating in the oxygen mode comprises only the three principal steps: air feed, evacuation and repressuring.

In order that blower 16 may be permitted to operate continuously during intermittent periods when neither the A train nor the B train is on the air feed step and neither of these trains is on the nitrogen rinse step, a valve 59 is provided in the discharge line from blower 16. By this arrangement air entering the blower through open valve 14 is discharged to the atmosphere through opened valve 59.

For the removal of water and $CO_2$ from the ambient air feed, any of the known solid adsorbents suitable for this purpose may be employed in the pretreatment beds 12 and 13, such as: silica gel, alumina, activated carbon or a zeolitic molecular sieve of natural or synthetic origin such as sodium mordenite, or commercial 5A or 13X zeolites. In the main adsorbent beds 10 and 11 one may employ any solid adsorbent having preferential affinity for adsorption of nitrogen from its admixture with oxygen, such as commercial 5A molecular sieve

TABLE 1

| TRAIN A | | TRAIN B | | VALVE POSITIONS | | | | | | | | | | | | |
|---|---|---|---|---|---|---|---|---|---|---|---|---|---|---|---|---|
| PT | MAIN | PT | MAIN | 14 | 18 | 19 | 22 | 24 | 25 | 40 | 50 | 59 | 51 | 62 | 65 | 66 |
| AF | AF | E | E | O | O | C | O | O | C | C | C | C | O | O | C | C |
| NR | NR | E | E | C | O | C | O | C | O | O | C | C | O | O | C | C |
| NR | NR | EX | R | C | O | C | O | C | O | O | C | C | O | C | C | O |
| E | E | R | R | O | C | C | O | C | C | C | O | O | C | O | C | O |
| E | E | AF | AF | O | C | O | O | C | C | C | O | C | C | O | C | O |
| E | E | NR | NR | C | C | O | O | C | C | O | O | C | C | O | O | C |
| EX | R | NR | NR | C | C | O | C | O | C | O | O | C | C | O | O | C |
| R | R | E | E | O | C | C | O | O | C | C | C | O | O | O | C | C |
| AF | AF | E | E | O | O | C | O | O | C | C | C | C | O | O | C | C |

AF = AIR FEED
NR = NITROGEN RINSE
E = EVACUATION OF MAIN & PT VESSELS
EX = EVACUATION OF PT VESSEL
R = REPRESSURIZATION
C = CLOSED
O = OPEN (calcium zeolite A) or a synthetic sodium mordenite having pore openings in the 5 to 10 Angstrom range.

In using the novel control system of the present invention in the operation of a VSA system for the recovery of nitrogen and/or oxygen from atmospheric air, no change is required in the usual operating conditions generally employed for such purpose. The air feed step may be carried out by about atmospheric pressure or at a pressure level somewhat above or below atmospheric; say, in the range of about 700–800 Torr, to which pressure level the on-stream train is brought by repressuring the columns with previously recovered oxygen-rich gas. The vacuum desorption of the previously nitrogen-rinsed main adsorbent columns 10 and 11 is effected by bringing these columns to an intermediate pressure level in the preferred range of 40 to 200 Torr. The final vacuum desorption of pretreatment beds 12 and 13 is preferably at a final pressure level in the range of 5 to 100 Torr.

FIG. 6 illustrates a process timing sequence to be employed in operation of an embodiment according to FIGS. 1 and 2 of the invention, utilizing two parallel adsorption trains designated A and B. Table 2 below indicates the average duration time range for each of the steps of the cycle sequence and the preferred operation as indicated by the prototype cycle.

TABLE 2

| | Av. Time (secs.) | Prototype Cycle Time (secs.) |
|---|---|---|
| R = Repressurization | 10–30 | 30 |
| AF = Air Feed | 30–50 | 45 |
| NR = Nitrogen Rinse | 20–40 | 35 |
| E = Evacuation | 60–120 | 100 |
| EX = Extended Evacuation | 5–20 | 10 |

Figure 4:
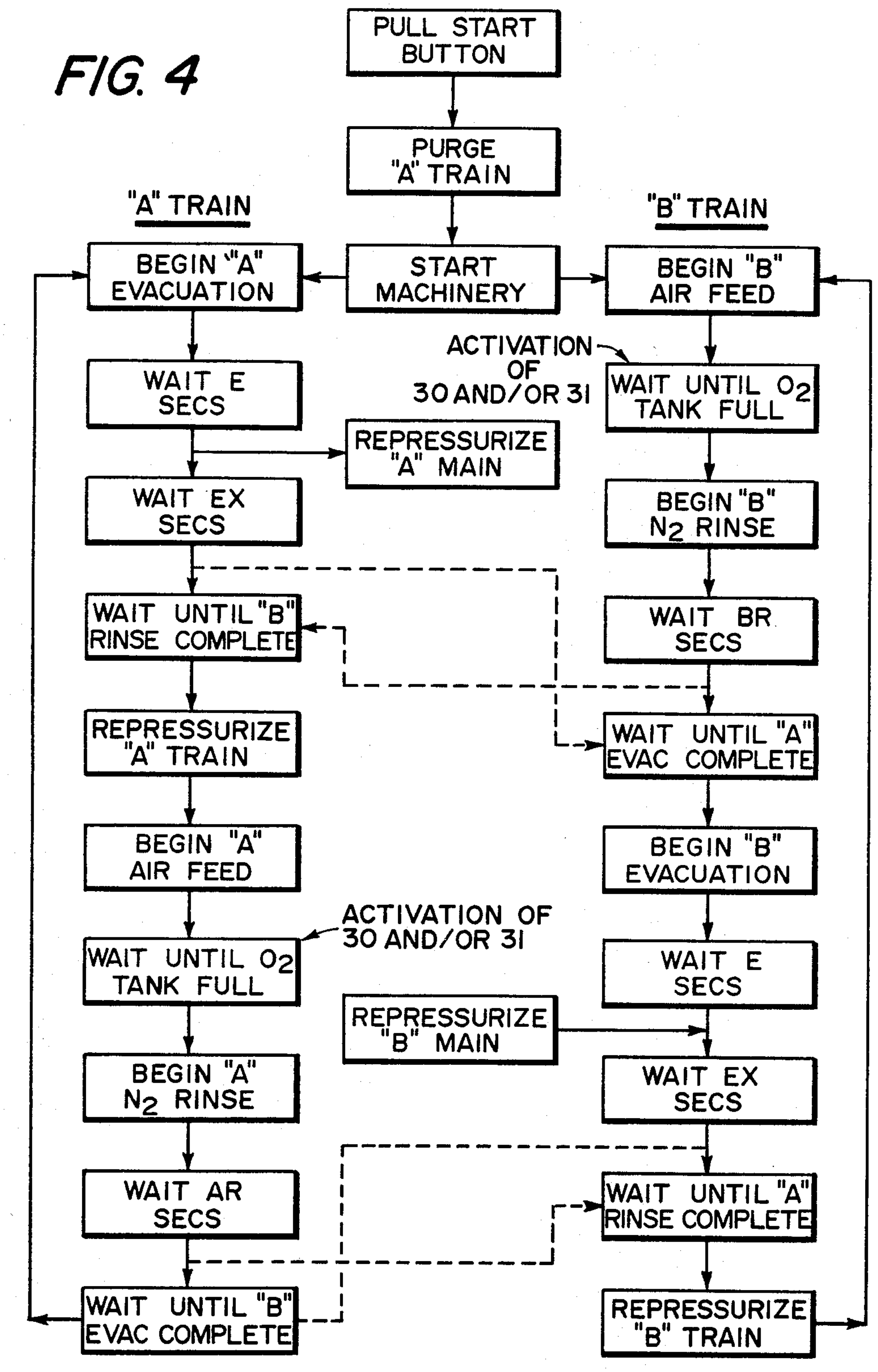
FIG. 4 is a schematic block diagram of a sequence for automatic operation of a control system according to the embodiments of FIGS. 1 and 2.

FIG. 4 illustrates the cycle sequence programmed for automatic operation of a system for practice of the invention according to the embodiments illustrated in FIGS. 1 and 2. The system is purged before start-up of the adsorption cycle. At start-up, while the A train is being evacuated the repressured B train is put on air feed. The sequence of steps followed in the B train is shown by the blocks on the right hand side of FIG. 4. Air feed to columns 13 and 11 of the B train continues until surge vessel 27 has been filled to the extent of actuating sensor 30 or 31, at which time valve 14 controlling air feed into the train B and valve 66 controlling outlet of oxygen-enriched gas from column 11 are both closed. At this time also, valve 40 is automatically opened to initiate rinsing of columns 13 and 11 with nitrogen from vessel 41. As already explained the duration of the nitrogen rinse step may be shortened or extended depending upon the nitrogen inventory in 41. Also, the initiation of evacuation of train B as indicated by the dotted arrow line leading to the block marked "Wait until A evac complete", is delayed until any extended evacuation of the A train has been fully completed during the time (seconds) fixed by the relays. Evacuation of the B train then is continued, according to the FIG. 1 embodiment, for the fixed period set by the cycle timer or for the extended time period which coincides with the completion of the nitrogen rinse step in train A. Alternatively, in accordance with the FIG. 2 embodiment, the duration of the evacuation is continued until a preset vacuum level is attained in column 11 and switch 71 is thereby activated to effect closing of valve 62 between columns 11 and 13. Evacuation of pretreat column 13 alone continues while repressuring of column 11 with oxygen-enriched gas is initiated. Evacuation of column 13 is discontinued after a preset fixed time period or until the nitrogen rinse step of train A has been completed. At the completion of evacuation of column 13, valve 62 is reopened to permit flow of repressuring gas from column 11 into column 13. When columns 11 and 13 are both at operating pressure, the cycle is repeated beginning with the introduction of feed air into train B.

Train A (left side of FIG. 4) goes through the same sequence of steps as described for train B, starting with evacuation of the A train when feed air is being introduced into the B train.

The control of the duration of the nitrogen rinse step preferably by the nitrogen inventory in vessel 41 is illustrated in FIG. 5. Thus, during evacuation of the B train the desorbed nitrogen is discharged into vessel 41. Sensors 47 and/or 48 determine whether vessel 41 has been filled to design level. If vessel 41 is indicated to be "full", the system follows the Y (yes) path, increasing the nitrogen rinse time for the B train (BR), operating towards attaining the maximum level of the range set by the nitrogen rinse timer and the excess nitrogen is utilized in the nitrogen rinse step thereby increasing product purity. If the nitrogen inventory in vessel 41 falls below that needed to activate sensors 47 and/or 48 during a particular cycle, as indicated by path N in FIG. 5, the nitrogen rinse timer setting will be reduced by a fixed amount such that the nitrogen rinse time will continue to decrease by increasing amounts during each successive cycle until the inventory in vessel 41 is sufficient to activate sensors 47 and/or 48. Thus the extent of rinsing is adjusted to compensate for increases and decreases in the product nitrogen flow and increases and decreases in the volume of evacuated gas caused by temperature variations or other fluctuations occurring.

It will be understood that while FIG. 5 depicts the control system as applied to the B train, the same control of the operation is equally applicable to the A train.

The cycle sequence of operations in accordance with the FIG. 3 embodiment is depicted in the chart of FIG. 7. As seen from the chart, the A train is permitted to idle during a short period between completion of the air feed step and the initiation of evacuation. This idle period can be eliminated be increasing the capacity of the vacuum system (52) thereby reducing the time for the evacuation and extended evacuation steps and balancing the cycle. During the entire period that the A train undergoes the sequence: repressuring (R), air feed (AF) and idle, the B train is on evacuation (E) and (EX). Alternately, the B train undergoes this same recited sequence when the A train is being evacuated.

By controlling inventory of gas collected respectively in the nitrogen and/or oxygen surge vessels 41 and 27, in accordance with the present invention, certain of the difficulties heretofore encountered in plant scale operation of prior air fractionation systems, wherein analysis of the oxygen content of the primary effluent from the main adsorbent columns is utilized as the principal control for terminating the air feed step. Among the drawbacks of such prior systems is one caused by drift in calibration of the oxygen analyzer as a result of time and a variation in ambient temperature. Moreover, since the inventory in the oxygen storage vessel is not monitored, there is no assurance that enough gas will be constantly available to provide for the required repressurization of the columns. In operation of such prior art VSA installations, the control system is designed to meet a fixed production rate at the hottest temperature. As the temperature drops there is no provision for automatic adjustment of the nitrogen rinse, the extent of which rinse could be utilized for improving product purity; instead of which the nitrogen product must be vented from the nitrogen surge vessel. On the other hand, absent monitored control of inventory in the nitrogen surge vessel, should the content of the nitrogen surge vessel become too low for the required rinse, it may become necessary to shut down operation of the unit.

The control system of the present invention not only avoids these drawbacks of the prior art control systems, but provides added advantages including the ability for operation at a variable production rate through the facility of adjusting the nitrogen rinse accordingly. By adjusting the nitrogen rinse, the excess in nitrogen production can be beneficially utilized to maximize product purity.

What is claimed:

1. In the operation of a cyclic system for recovery of an enriched-oxygen effluent product by selective adsorption of nitrogen from an ambient air feed stream, wherein said ambient air previously freed of contained water and $CO_2$ is passed through a bed of solid adsorbent selective in retention of nitrogen as opposed to oxygen, with resulting production of an oxygen-enriched gaseous effluent which is withdrawn from said bed and collected in a receiver; and wherein the resulting nitrogen-loaded adsorbent is desorbed by application of vacuum thereto, followed by repressuring of the adsorbent bed with a portion of said oxygen-enriched gaseous effluent; the improvement which comprises automatically controlling the duration of the air feed step by monitoring the inventory of oxygen-enriched gas in said receiver.

2. The improvement as defined in claim 1 in which said receiver is expansible and wherein said feeding of air is continued until said expansible receiver has been filled to a sensed preset height level, at which time further feeding of air to said bed is automatically discontinued.

3. The improvement as defined in claim 1 wherein said feeding of air is continued until a preset gas pressure level is detected in said receiver, at which time further feeding of air to said bed is automatically discontinued and vacuum desorption of said bed initiated.

4. The improvement as defined in claim 1 as applied to a cyclic system wherein the ambient air is freed of contained water and $CO_2$ by being passed through an adsorbent bed in series with said bed of solid adsorbent selective in retention of nitrogen.

5. In the fractionation of air by a vacuum swing adsorption process comprising the sequential steps of (1) introducing the air, freed of water and $CO_2$, into a bed of adsorbent selective in retention of nitrogen and collecting the unadsorbed oxygen-enriched effluent in a first receiver; thereafter (2) rinsing the nitrogen-laden bed with a stream of high purity nitrogen gas withdrawn from storage in a second receiver; (3) desorbing the nitrogen-laden bed by application of vacuum thereto and passing the desorbed nitrogen effluent into said second receiver; and (4) repressuring said adsorbent bed by admission of oxygen-enriched gas therein withdrawn from said first receiver; the improvement which comprises controlling the duration of steps (1) and/or (2) respectively by monitoring the gas inventory in said first and/or second receivers.

6. The improvement as defined in claim 5 in which said first receiver is expansible and wherein the duration of step (1) is automatically terminated following actuation of a height level sensing means associated with said first expansible receiver.

7. The improvement as defined in claim 6 wherein following actuation of said height level sensing means the introduction of air and collection of the oxygen-enriched effluent is continued for a preset fixed time period after initial actuation of said level sensing means.

8. The improvement as defined in claim 5 wherein the duration of step (1) is automatically terminated after a preset pressure level is attained is said first receiver.

9. The improvement as defined in claim 8 wherein after said preset pressure level is attained in said first receiver the introduction of air and collection of the oxygen-enriched effluent is permitted to continue for a fixed time period before termination of step (1).

10. The improvement as defined in claim 5 in which said second receiver is expansible and wherein the duration of step (2) is automatically terminated following actuation of a height level sensing means associated with said second expansible receiver.

11. The improvement as defined in claim 10 wherein following actuation of said height level sensing means step (2) is continued for a preset fixed time period after initial actuation of said level sensing means.

12. The improvement as defined in claim 5 wherein the duration of step (2) is automatically terminated after a preset pressure level is attained in said second receiver.

13. The improvement as defined in claim 12 wherein after said preset pressure level is attained in said second receiver the operation of step (2) is permitted to continue for a fixed time period before the termination of step (2).

14. The improvement as defined in claim 5 wherein the vacuum desorption step (3) is continued until a preset vacuum level is attained in said adsorbent bed.

15. In a cyclic system for fractionation of air wherein during an on-stream period nitrogen is selectively adsorbed from the feed air in an adsorption column while collecting and storing in a surge vessel the oxygen-enriched primary gas effluent discharged from said adsorption column, and wherein the column laden with adsorbed nitrogen is subsequently desorbed under vacuum; means for controlling the duration of said on-stream air feed period comprising inventory monitoring means associated with said effluent storing surge vessel, said monitoring means being actuated when the sensed pressure level or the sensed height level of collected gas in said surge vessel attains a preset value, said monitoring means being operatively arranged to initiate valve closure terminating said on-stream air feed period.

16. A cyclic system as defined in claim 15 further comprising a second surge vessel for storing the nitrogen gas desorbed from said nitrogen-laden column, means for withdrawing a portion of the stored nitrogen from said second surge vessel and flowing the same through said nitrogen-laden column to rinse said column after the termination of said onstream air feed period, and means to control the duration of said nitrogen rinse; said last-named means comprising inventory monitoring means associated with said second surge vessel, said monitoring means being actuated when the pressure level or the height level of nitrogen gas in said second surge vessel attains a preset value; said monitoring means being operatively arranged to initiate valve closure terminating said nitrogen rinsing.

17. A cyclic system as defined in claim 16 wherein said inventory monitoring means associated with said second surge vessel further includes a time-delay device for extending the duration of said nitrogen rinse period for a preset time period after actuation of said monitoring means, during which extended time period the defined valve closure is delayed.

18. A cyclic system as defined in claim 16 wherein said inventory monitoring means associated with said effluent-storing purge vessel further includes a time delay device for extending the duration of said on-stream air feed period for a preset time period following actuating of said monitoring means, during which extended time period the defined valve closure is delayed.

19. A cyclic system as defined in claim 15 wherein said inventory monitoring means associated with said effluent-storing surge vessel further includes a time delay device for extending the duration of said on-stream air feed period for a preset time period following actuation of said monitoring means, during which extended time period valve closure is delayed.

20. A cyclic system as defined in claim 15 further comprising means for controlling the duration of the recited vacuum desorption step, said control means comprising a vacuum level sensing switch operatively associated with the nitrogen adsorption column.

21. In a vacuum swing adsorption system for the fractionation of air wherein air free of water and carbon dioxide is introduced into a column of adsorbent selective in retention of nitrogen and the unadsorbed oxygen-enriched effluent is collected in a first surge vessel, the nitrogen-laden column is rinsed with a stream of high purity nitrogen gas withdrawn from a second surge vessel, the nitrogen-laden column is desorbed by application of vacuum thereto with the desorbed nitrogen effluent passing to said second surge vessel and repressurizing said column by admission of oxygen-enriched gas withdrawn from said first surge vessel; the improvement comprising means for controlling the duration of said air introduction and/or said rinsing of said nitrogen laden bed including an inventory monitoring means associated with said first and/or second surge vessels, said monitoring means being actuated when the sensed pressure level or the sensed height level of collected gas in the respective surge vessels attains a preset value, said monitoring means being operatively arranged to initiate valve closure terminating said air introduction period and/or said nitrogen rinse period.

22. A system as defined in claim 21 wherein said first surge vessel is expansible.

23. A system as defined in claim 21 wherein said second surge vessel is expansible.

* * * * *

UNITED STATES PATENT AND TRADEMARK OFFICE
CERTIFICATE OF CORRECTION

PATENT NO. : 4,539,019

DATED : September 3, 1985

INVENTOR(S) : William R. Koch

It is certified that error appears in the above-identified patent and that said Letters Patent is hereby corrected as shown below:

In Column 10, Line 15 the second occurrence of the word "--is--" should read --in--.

Signed and Sealed this

*Twenty-seventh* Day of *May 1986*

[SEAL]

*Attest:*

DONALD J. QUIGG

*Attesting Officer* *Commissioner of Patents and Trademarks*